(12) United States Patent
Xu

(10) Patent No.: US 11,080,839 B2
(45) Date of Patent: Aug. 3, 2021

(54) SYSTEM AND METHOD FOR TRAINING A DAMAGE IDENTIFICATION MODEL

(71) Applicant: Alibaba Group Holding Limited, Grand Cayman (KY)

(72) Inventor: Juan Xu, Beijing (CN)

(73) Assignee: Advanced New Technologies Co., Ltd., George Town (KY)

( * ) Notice: Subject to any disclaimer, the term of this patent is extended or adjusted under 35 U.S.C. 154(b) by 85 days.

(21) Appl. No.: 16/554,223

(22) Filed: Aug. 28, 2019

(65) Prior Publication Data
US 2020/0090320 A1  Mar. 19, 2020

(30) Foreign Application Priority Data

Aug. 31, 2018 (CN) .......................... 201811012749.2

(51) Int. Cl.
*G06K 9/00* (2006.01)
*G06T 7/00* (2017.01)
(Continued)

(52) U.S. Cl.
CPC ........ *G06T 7/0002* (2013.01); *G06F 16/5866* (2019.01); *G06K 9/623* (2013.01);
(Continued)

(58) Field of Classification Search
CPC ........ G06T 7/0002; G06T 2207/30248; G06T 2207/20081; G06T 2207/30156;
(Continued)

(56) References Cited

U.S. PATENT DOCUMENTS

| 8,180,629 B2 | 5/2012 | Rehberg |
| 9,036,943 B1 * | 5/2015 | Baldwin ............ G06K 9/00664 382/284 |

(Continued)

FOREIGN PATENT DOCUMENTS

| WO | 2017059576 | 4/2017 |
| WO | 2018055340 | 3/2018 |

OTHER PUBLICATIONS

Jeffery De Deijn, ("Automatic car damage recognition using convolutional neural networks", Internship report MSc Business Analytics Mar. 29, 2018, pp. 1-53, Vrije Universiteit Amsterdam Faculty of Science, Amsterdam) (Year: 2018).*

(Continued)

*Primary Examiner* — Amara Abdi
(74) *Attorney, Agent, or Firm* — Shun Yao; Park, Vaughan, Fleming & Dowler LLP.

(57) ABSTRACT

A system is provided for identifying damages of a vehicle. During operation, the system can obtain a set of digital images associated with a set of tagged digital images as training data. Each tagged digital image in the set of tagged digital images may include at least one damage object. The system can train a damage identification model based on the training data. When training the damage identification model, the system may identify at least a damage object in the training data based on a target detection technique. The system may also generate a set of feature vectors for the training data. The system can use the set of feature vectors to optimize a set of parameters associated with the damage identification model to obtain a trained damage identification model. The system can then apply the trained damage identification model to obtain a damage category prediction result.

20 Claims, 8 Drawing Sheets

(51) Int. Cl.
*G06F 16/58* (2019.01)
*G06N 20/00* (2019.01)
*G06N 5/04* (2006.01)
*G06K 9/62* (2006.01)

(52) U.S. Cl.
CPC ......... *G06K 9/6256* (2013.01); *G06K 9/6267* (2013.01); *G06N 5/04* (2013.01); *G06N 20/00* (2019.01); *G06T 2207/20081* (2013.01); *G06T 2207/30248* (2013.01)

(58) Field of Classification Search
CPC ... G06T 7/0004; G06F 16/5866; G06F 16/55; G06N 20/00; G06N 5/04; G06N 3/0454; G06N 5/003; G06N 20/20; G06K 9/6256; G06K 9/6267; G06K 9/623; G06K 9/00624; G06Q 40/08; G06Q 10/20
See application file for complete search history.

(56) References Cited

U.S. PATENT DOCUMENTS

| | | | |
|---|---|---|---|
| 9,607,138 | B1 | 3/2017 | Baldwin |
| 2001/0046659 | A1 | 11/2001 | Oster |
| 2009/0206993 | A1 | 8/2009 | Di Mambro |
| 2013/0015946 | A1 | 1/2013 | Lau |
| 2013/0208103 | A1 | 8/2013 | Sands |
| 2014/0037184 | A1 | 2/2014 | Gorski |
| 2014/0270411 | A1 | 9/2014 | Shu |
| 2014/0309805 | A1* | 10/2014 | Ricci ............... B60K 35/00 701/1 |
| 2015/0110364 | A1 | 4/2015 | Niinuma |
| 2015/0110366 | A1 | 4/2015 | Sezille |
| 2015/0341370 | A1 | 11/2015 | Khan |
| 2016/0034786 | A1 | 2/2016 | Suri |
| 2016/0063235 | A1 | 3/2016 | Tussy |
| 2016/0283787 | A1 | 9/2016 | Nepomniachtchi |
| 2016/0307029 | A1 | 10/2016 | Vaknin |
| 2017/0048244 | A1 | 2/2017 | Loughlin-McHugh |
| 2017/0060867 | A1 | 3/2017 | Moutinho |
| 2017/0061563 | A1 | 3/2017 | Falkenstern |
| 2017/0148102 | A1* | 5/2017 | Franke ............ G06Q 30/0278 |
| 2017/0293894 | A1* | 10/2017 | Taliwal ............ G06K 9/00671 |
| 2018/0047208 | A1* | 2/2018 | Marin ............... H04N 13/243 |
| 2018/0083973 | A1 | 3/2018 | Paraskevas |
| 2018/0260793 | A1* | 9/2018 | Li .................... G06T 7/001 |
| 2019/0073641 | A1* | 3/2019 | Utke ................. G06Q 10/20 |

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.

Zhou Huabing et al.: "Image Classification Based on Region of Interest Detection", Visual Communications and Image Processing; Jan. 20, 2004; San Jose; vol. 9813, Dec. 14, 2015, pp. 9813OU-9813OU, XP060063208, paragraph [0001]; figure 1.

* cited by examiner

SYSTEM AND METHOD FOR TRAINING A DAMAGE IDENTIFICATION MODEL

RELATED APPLICATION

Under 35 U.S.C. 119, this application claims the benefit and right of priority of Chinese Patent Application No. 201811012749.2, filed Aug. 31, 2018.

BACKGROUND

Field

This disclosure is generally related to the technical field of machine learning. More specifically, this disclosure is related to a method and system for training a damage identification model for use in intelligent damage assessment of vehicles.

Related Art

In conventional vehicle insurance damage assessment approaches, a vehicle insurance company can send a claim adjuster to the site of the damaged vehicle to conduct a manual survey and damage assessment. The survey and damage assessment conducted by the adjuster can include the following tasks: determining a repair solution, estimating an indemnity, taking photographs of the vehicle on the site and archiving the photographs for subsequent assessment of the damage by a damage inspection person at the vehicle insurance company. Since the on-site survey and subsequent damage assessment are performed manually, an indemnity claiming cycle can be as long as 1-3 days. Such long processing times can result in poor user experience with the vehicle insurance company. Furthermore, since the survey and damage assessments are performed manually, the insurance company may incur large labor and professional training costs.

Due to the above-mentioned drawbacks of using manual survey and damage assessments, vehicle insurance companies have started to apply image-based artificial intelligence and machine learning to vehicle damage assessment approaches that may shorten the wait time and reduce labor costs. These approaches enable automatic identification of damaged parts and damage degrees from on-site pictures of the vehicle taken by users. In addition, the on-site pictures of the vehicle can be used by computer-vision image identification technology with artificial intelligence to provide a repair solution. Therefore, by automating the survey and damage assessment approaches, a vehicle insurance company can reduce the labor costs and improve user experience.

However, some challenges still remain in providing accurate damage identification while using the automated survey and damage assessment approaches for assessing vehicle damage.

SUMMARY

According to one embodiment of the present invention, a system for identifying damages of a vehicle is provided. During operation, the system can obtain a set of tagged digital images as training data. Each tagged digital image in the set of tagged digital images may include at least one damage object, and an area comprising the damage object can be tagged with a damage bounding box and a damage category tag corresponding to the damage bounding box.

The system can train a damage identification model based on the training data. During the process of training the damage identification model, the system may identify at least a damage object in the training data based on a target detection technique. The system may also generate a set of feature vectors for the training data. The system can use the set of feature vectors to optimize a set of parameters associated with the damage identification model to obtain a trained damage identification model. The system can then apply the trained damage identification model to obtain a damage category prediction result.

In a variation on this embodiment, an area comprising the damage object is tagged with a damage bounding box and a damage category tag corresponding to the damage bounding box; and the damage category tag indicates a damage material and a damage mode.

In a variation on this embodiment, the damage material can include one of: a painted piece, a plastic piece, a metal piece, a sanded piece, and a glass.

In a variation on this embodiment, the damage mode can include one of: a scratch, a deformation, a crack, and a fragmentation.

In a further variation on this embodiment, the damage category tag can further indicate a damage degree, and the damage degree can correspond to at least one of: minor damage; medium damage; and severe damage.

In a further variation on this embodiment, the system may further reduce noise associated with the identified damage object in the training data by determining whether a sub-area associated with the identified damage object corresponds to a maximum damaged area. In response to the system determining that the sub-area does not include the maximum damaged area, filtering out negative matches and retaining positive matches.

In a variation on this embodiment, negative matches indicate that one or more portions in the sub-area do not include the damage object, and wherein the positive matches indicate that the one or more portions in the sub-area includes the damage object.

In a further variation on this embodiment, the system can apply the training damage identification model to obtain a damage category prediction result by first obtaining an untagged digital image of a target object (or a vehicle). The system can then provide the digital image to the trained damage identification model. The system can use the trained damage identification model to identify a damage object from the digital image, and determine a damage category prediction result associated with the identified damage object. The system can then determine a damage material and a damage mode of the damage object based on the damage category prediction result and a mapping table.

In a further variation on this embodiment, the system can determine a repair solution based on the damage category prediction result and the mapping table.

BRIEF DESCRIPTION OF THE FIGURES

In the figures, like reference numerals refer to the same figure elements.

DETAILED DESCRIPTION

Figure 1:
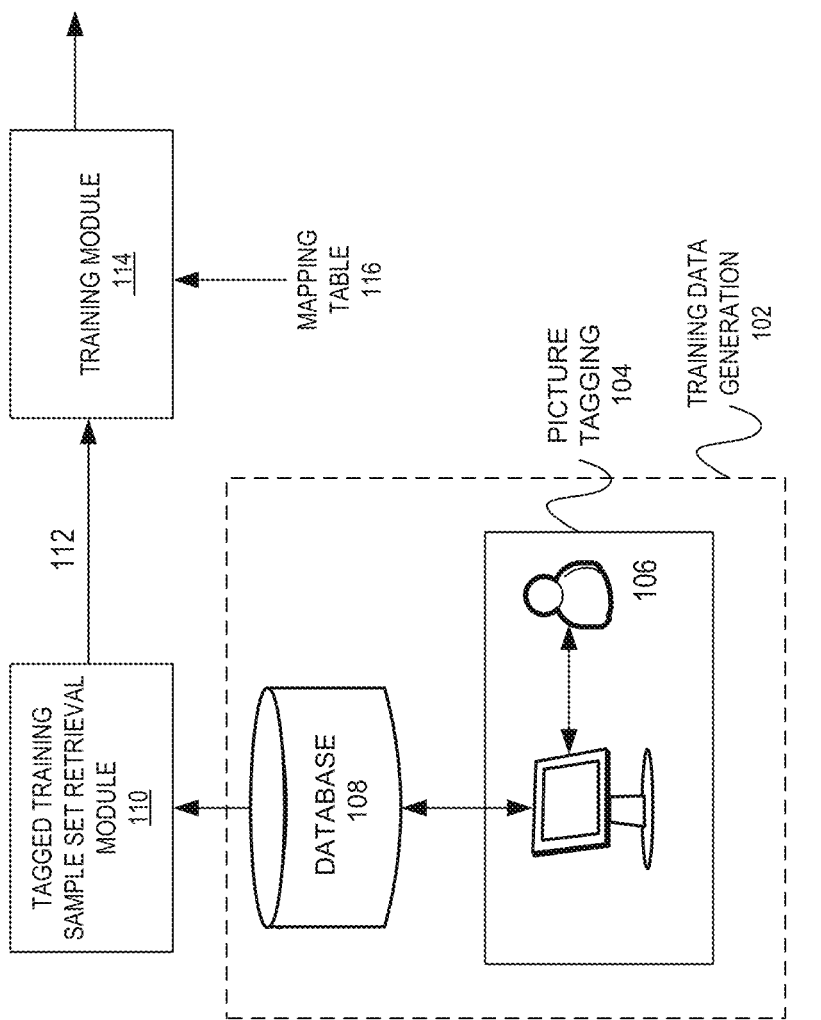
FIG. 1 shows an exemplary damage identification model training architecture, according to one embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In a conventional method used to identify damage conditions (e.g., damaged parts and degrees of damage) of a damaged vehicle, the captured image of the damaged vehicle is compared with a plurality of similar images of different vehicles previously stored in a database. In addition, vehicle part areas can be compared with history data to obtain similar images for determining damage degree of the identified parts.

These conventional methods are prone to interferences, e.g., global information, reflections and/or dirt on the surface of the vehicle. Specifically, while real damages in the digital image of a vehicle may be correctly detected, reflections and/or dirt may be falsely detected as damages, thereby resulting in the occurrence of false positives in a damage detection result. Furthermore, the accuracy with which a damage degree is identified can be negatively affected. Therefore, the conventional methods do not always generate accurate damage detection results.

The embodiments described herein solve the technical problem of determining the damage degree of damaged areas with high accuracy. More specifically, the system may train a damage identification model to determine the damage degree of a damaged area independently of a part of the vehicle associated with the damaged area. The system may identify damaged areas of different materials and damage degrees associated with the damaged areas. For example, the system may determine damage degrees associated with the following materials: painted pieces, plastic pieces, sanded pieces, glass, lights, mirrors, etc. The embodiments described herein can be applicable to damage identification of similar materials in other scenarios.

Since the system can determine the damage degrees independently of the part of the vehicle involved, the burden of storing and using huge amount of information associated with the different parts of the vehicle can be reduced. Consequently, the system can reduce the amount of used memory, improve detection performance, and improve accuracy of the damage detection.

According to one embodiment of the present invention, a system for training a damage identification model is provided. During operation, the system can obtain a set of digital images associated with a tagged training sample set as training data. Each tagged digital image in the tagged training sample set may include at least one damage object, and an area comprising the damage object can be tagged with a damage bounding box and a damage category tag corresponding to the damage bounding box. The system can train a damage identification model based on this training data. During the process of training the damage identification model, the system may identify at least a damage object in the training data based on a target detection technique. The system may also reduce noise associated with the identified damage object in the training data, and generate a set of feature vectors for the noise reduced training data. The system can then use the set of feature vectors to optimize a set of parameters associated with the damage identification model to obtain a trained damage identification model.

System Architecture

FIG. 1 shows an exemplary damage identification model training architecture, according to one embodiment of the present invention. The damage identification model training system 100 can include a tagged training sample set retrieval module 110 and a training module 114.

Damage identification model training system 100 can use a training data generation setup 102 to generate training data. System 100 may store a collection of pictures containing vehicle damage information in a database 108. These pictures are manually tagged by tagging person(s) 106 at a manual picture tagging platform 104 to generate a tagged training sample set. Tagging person(s) 106 may tag damage objects or damage areas in the pictures based on a predetermined set of rules. Specifically, for each picture the tagging person(s) 106 may tag an area where the damage object is located with a bounding box and may place a damage category tag for the damage object. The manner in which the pictures are tagged may determine a training effect of a damage identification model. In the following section different picture tagging formats are described in detail.

The damage category tag may be indicative of a damage part and a damage mode. For example, the damage category tag may include bumper deformation, front door scratch, and other similar damage category tags. If the vehicle includes m parts and n damage modes, then each picture may contain m*n number of category tags, thereby resulting in a large number of training samples. The difficulty of identification of parts and damages of the vehicle may be based on different pictures, thereby posing a challenge to picture tagging task. For example, vehicle global pictures may be suited for identification of the parts of the vehicle, but identifying damage details from such global pictures may be difficult. Detailed pictures of vehicles may be suited for identification of damages of the vehicle, but may be difficult to use in distinguishing the parts of the vehicle from such detailed pictures.

In one embodiment, the damage category tag may indicate a damage material and the damage mode, instead of being limited to the parts of the vehicle. The damage material may include for example, a painted piece, a plastic piece, a metal piece, a sanded piece, glass, a light, etc. The damage mode may include for example, a scratch, a deformation, a crack, a fragmentation, etc. Accordingly, the damage category tag may indicate for example, scratch of the painted piece, deformation of the metal piece, fragmentation of the glass, or other similar combinations of the damage material and the damage mode.

The damage category tag may further indicate a damage degree. The damage degree can include an intensity of the damage, for example, minor damage, medium damage, severe damage, etc. The damage category tag can indicate the damage material, damage mode, and damage degree. In other words, the damage category tag can include three different indicators, e.g., severe deformation of the metal piece, minor scratch of the glass, severe scratch of the glass, etc. The system may use the tagged training sample set that includes damage category tags indicative of the damage material, damage mode and/or damage degree, instead of including information indicative of only the parts of the vehicle. When the system trains a damage identification model using such a tagged training sample set, the system may provide accurate judgment for the damages, and provide a generalized identification capability with respect to damage objects independent of the parts of the vehicle.

In one embodiment, damage identification model training system 100 may pre-define a mapping table which includes mapping relations between different types of damage category tags and different combinations of damage material, damage mode, and damage degree. In the mapping table, the damage category tag can be represented as a digital tag. Subsequent to determining the damage material and the damage mode of a damage object in the picture under examination, tagging person(s) 106 may query the mapping table stored in database 108 to determine a digit corresponding to a combination of the damage material and the damage mode. Tagging person(s) 106 may use this digit as the damage category tag.

Table 1 (shown below) illustrates a first example of a mapping table, according to one embodiment of the present invention. Table 1 shows mappings between different digital tags and damage information. The damage information includes information about the damage material, the damage mode and the damage degree. The damage information of some damage objects may only include the damage material and the damage mode, e.g., digital tag 03 in Table 1 indicates fragmentation of the glass.

TABLE 1

A first example of a mapping table.

| DIGITAL TAG | DAMAGE INFORMATION |
|---|---|
| 01 | Minor scratch of the glass |
| 02 | Severe scratch of the glass |
| 03 | Fragmentation of the glass |
| 04 | Minor scratch of the painted piece |
| 05 | Minor deformation of the plastic piece |
| 06 | Severe deformation of the metal piece |
| ... | ... |

In one embodiment of the present invention, the damage category tag may be represented by a plurality of fields, with each field providing a different indicator for the damage object. For example, the damage category tag may include a combination of a first field and a second field, with the first field indicating the damage material and the second field indicating the damage mode. The first field may include letters, e.g., A, B, C, D, . . . , etc., with each letter representing one of: a painted piece, a plastic piece, a metal piece, a sanding piece, glass, light, etc. The second field may include digits, e.g., 1, 2, 3, 4, . . . , etc., with each digit representing: a scratch, a deformation, a crack, a fragmentation, or other damage modes. The damage category tag may further include a third field to indicate the damage degree, e.g., minor, medium, severe, or other damage degrees.

Damage identification model training system 100 may record mapping between a value of each field and the associated damage information according to a mapping table shown in Table 2 (shown below). Table 2 presents a second example of a mapping table, according to one embodiment of the present invention. Table 2 shows mappings between different fields and damage information. The damage information includes information about the damage material, the damage mode, and the damage degree. Table 2 illustrates the following mapping relations: the value of the first field is mapped to the damage material, the value of the second field is mapped to the damage mode; and the value of the third field is mapped to the damage degree.

TABLE 2

A second example of a mapping table

| | FIRST FIELD (DAMAGE MATERIAL) | | SECOND FIELD (DAMAGE MODE) | | THIRD FIELD (DAMAGE DEGREE) |
|---|---|---|---|---|---|
| A | PAINTED PIECE | 1 | SCRATCH | Ss | MINOR |
| B | PLASTIC PIECE | 2 | DEFORMATION | Mm | MEDIUM |
| C | GLASS | 3 | CRACK | Xx | SEVERE |
| ... | ... | ... | ... | ... | ... |

Damage identification model training system 100 may provide complete damage information about a damage object by using different combinations of all the three fields. For example, B1Ss may indicate minor scratch of the plastic piece and A2Xx may indicate severe deformation of the painted piece. The damage information of some damage objects may include the damage material and the damage mode, but may not include the damage degree; in this case the third field may be omitted.

Damage identification model training system 100 may store the tagged pictures in database 108, after tagging person(s) 106 have tagged each picture in the plurality of pictures with at least one bounding box and a corresponding damage category tag based on either Table 1 or Table 2. A tagged training sample set retrieval module 110 can retrieve the tagged pictures from database 108, and may send the tagged pictures (or tagged training sample set 112) to a training module 114 to train a damage identification model.

Training module 114 may perform deep learning target detection on the tagged training sample set 112 to detect damage objects. The following section addresses some of the problems encountered in target detection of objects in images. Target detection is related to the field of computer vision and image processing that addresses the detection of objects in digital images. One challenge encountered in detecting damage objects by target detection algorithms is that the area and location of a damage object may not be unique. Moreover, a sub-area of the damage object may have a same damage degree or different damage degrees. In addition, the target detection algorithm may define all sub-areas with Intersection over Union (IoU) metric less than 50% as negative matches, this may cause a large amount of noise during the identification of the damage object. Furthermore, effective sampling of positive matches in the sub-area may be difficult to obtain.

Therefore, to address these problems in the target detection algorithm, training module 114 may first determine whether a sub-area in the image corresponds to a maximum damaged area. If the sub-area corresponds to a maximum damaged area, the sub-area is said to include maximum number of positive matches. If the sub-area does not correspond to the maximum damaged area, negative matches in the sub-area are sampled to reduce noise due to the negative matches, and positive matches in the sub-area are retained. Thereby, increasing a number of positive matches associated with a damaged area that may be predicted to contain the damage object may increase a sampling effect of the positive samples and increase the accuracy of damage identification. Furthermore, training module 114 may apply the target detection algorithm to automatically combine the predicted damaged areas to generate positive matches and hence provide effective sampling of the positive matches.

As a result, training module 114 effectively addresses the problem in a typical target detection method and may increase the accuracy of damage identification. During the process of training the damage identification model, training module 114 may construct multi-damage object detection results in the dimension of the bounding box associated with the damage object. Training module 114 may then extract feature vectors associated with the identified damage object, and may input these feature vectors to the damage identification model for processing. Furthermore, training module 114 may optimize parameters of the damage identification model based on tag comparison to obtain a trained damage identification model. The damage identification model can then be used for identifying damage categories from vehicle damage pictures. Since the damage category tags may have different values, the damage identification model may be a multi-categorization model.

In one embodiment of the present invention, the damage identification model may be a model based on a convolutional neural network (CNN). Specifically, training module 114 may apply the following target detection models: Faster-Region based convolutional neural network (Faster-RCNN), You Only Look Once (Yolo), Region based convolutional neural network (RCNN), lighthead-RCNN, and other similar models. Training module 114 may also be integrated into a user terminal as a MobileNet (efficient convolutional neural network that can be used for vision applications on mobile devices), Single Shot Detector (SSD) and light weighted target detection model that is applicable to a mobile terminal. Training module 114 may apply a Gradient Boosted Decision Tree (GBDT) to perform training and optimization of the damage identification model. Applying GBDT for training and optimization may further improve accuracy of identification of damage objects based on the vehicle picture.

Figure 2:
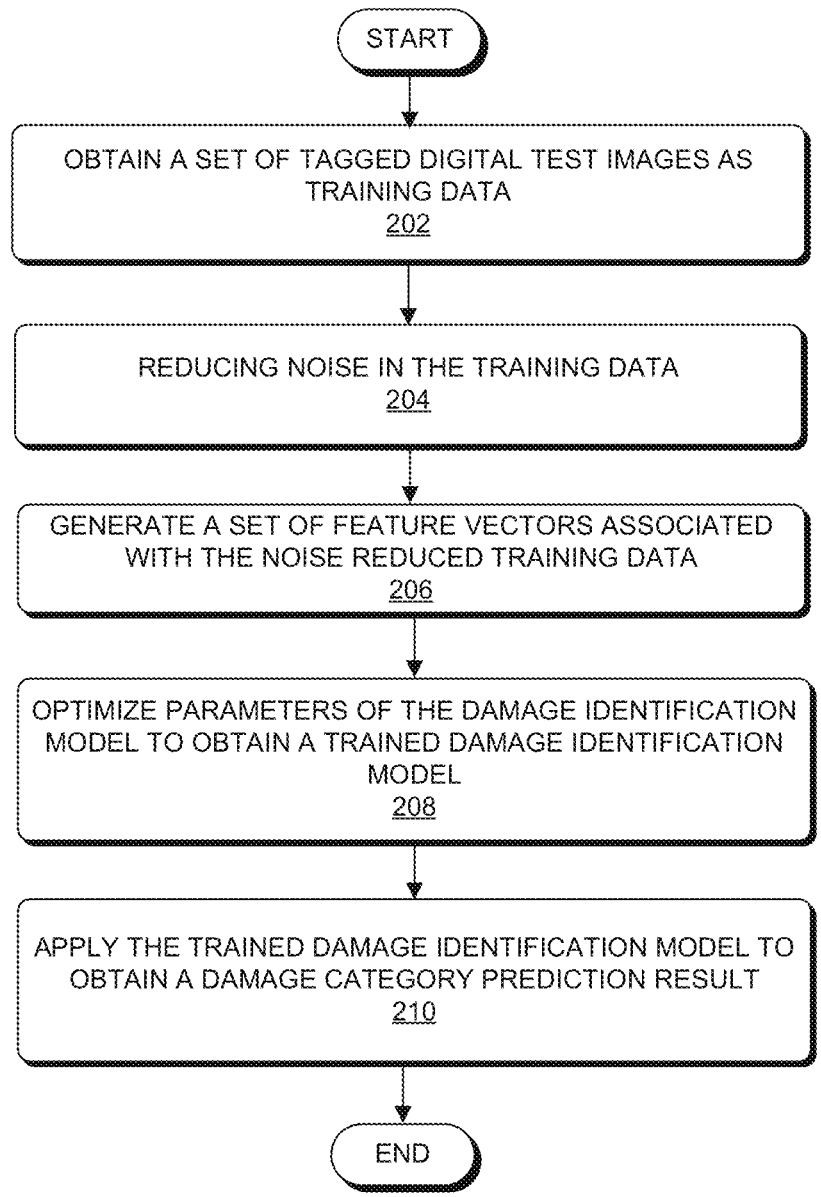
FIG. 2 presents a flowchart illustrating an exemplary process for training a damage identification model, in accordance with an embodiment of the present invention.

FIG. 2 presents a flowchart illustrating an exemplary process for training a damage identification model, in accordance with an embodiment of the present invention. During the process of training a damage identification model, the system may obtain a set of tagged pictures associated with a set of test vehicles (operation 202). The system may then allow a tagging person to tag each damage object in each picture from a set of pictures. For example, an area within which the damage object is identified can be marked by a bounding box and the tagging person can further include a damage category tag for the bounding box. In this manner all the pictures containing at least one damage object are tagged by the tagging person.

The damage bounding box marks a damage area where the damage object is located by a minimum rectangular box that contiguously surrounds the damaged area containing the damage object. The damage category tag indicates a damage material and a damage mode. Since the tagged pictures include damage category tags that include information about the damage material and the damage mode of the damage object, and are not limited to the parts of the vehicle, the number of training samples is reduced significantly. Specifically, if the vehicle includes m parts and n damage modes, then each picture may contain m*n number of category tags, thereby resulting in a large number of training samples. Therefore, by applying a damage category tag that represents only the damage material and the damage mode of the damage object, the issue of identifying damage degree in an m*n dimension is transformed into the issue of m-dimension part identification and n-dimension damage identification.

Subsequent to tagging the pictures to obtain a tagged training sample set, the system may train a damage identification model. During the process of training the damage identification model, the system may reduce noise in an area identified to contain the damage object to improve the accuracy of damage identification (operation 204). The system may apply a multi-damage object detection model to generate feature description of the noise reduced tagged training sample set (operation 206). The system may then optimize parameters of the damage identification model based on tag comparison to obtain a trained damage identification model. (operation 208).

Figure 3:
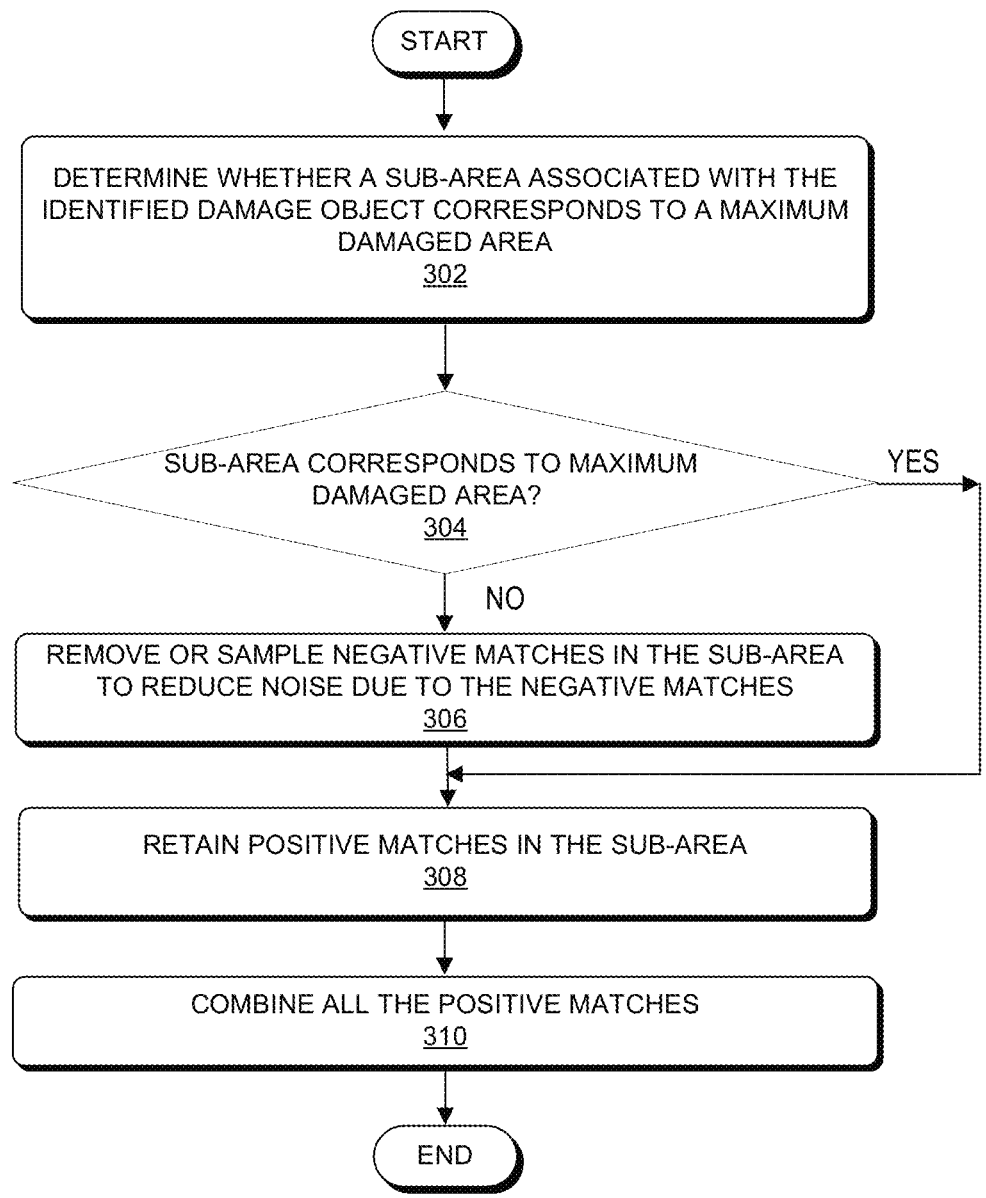
FIG. 3 presents a flowchart illustrating an exemplary process for reducing noise in a tagged training sample set, in accordance with an embodiment of the present invention.

FIG. 3 presents a flowchart illustrating an exemplary process for reducing noise in a tagged training sample set, in accordance with an embodiment of the present invention. During operation, the system may use the tagged training sample set including a plurality of tags to determine whether a sub-area in the image of the vehicle corresponds to a maximum damaged area (operation 302 and 304). In response to the system determining that the sub-area does not correspond to the maximum damaged area, the system removes or samples the negative matches (operation 306). Note that one or more portions in the sub-area that do not include the damage object represent a negative match. The system may retain positive matches, i.e., the one or more portions in the sub-area that include the damage object represent a positive match (operation 308), thereby increasing positive matches associated with a damaged area that may be predicted to contain the damage object. The system may then combine the predicted damaged areas to include all the positive matches (operation 310). In one embodiment of the present invention, to improve accuracy of identification of damage objects, the system may apply Gradient Boosted Decision Trees (GBDT) to train and optimize the damage identification model.

Figure 4:
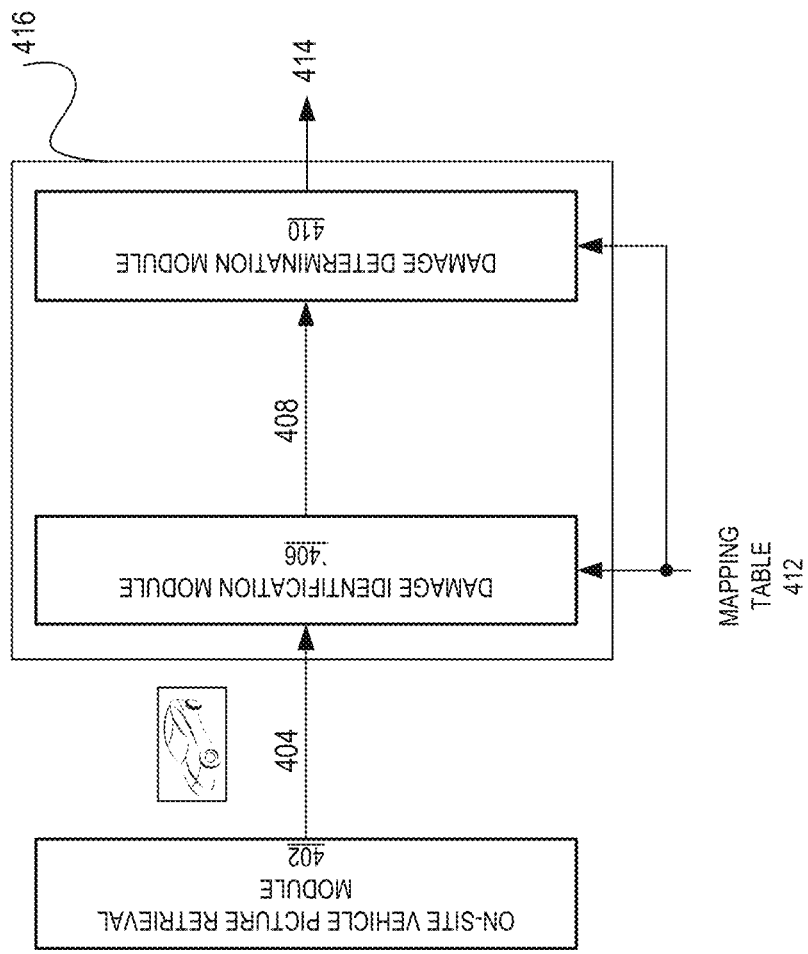
FIG. 4 shows an exemplary damage assessment architecture, according to one embodiment of the present invention.

FIG. 4 shows an exemplary damage assessment architecture, according to one embodiment of the present invention. During the process of performing damage assessment of a damaged vehicle, an on-site vehicle picture retrieval module 402 may retrieve an on-site picture 404 of a damaged vehicle. On-site picture 404 of a damaged vehicle may be a picture photographed by a user at a vehicle damage site. On-site vehicle picture retrieval module 402 may send retrieved on-site picture 404 to a damage assessment module 416. Damage assessment module 416 may include a damage identification module 406 and a damage determination module. Damage identification module 406 may include a previously trained damage identification model. The process of performing damage identification and the process of training the damage identification model may be performed separately. The process of training the damage identification model is illustrated in FIG. 2 and FIG. 3.

Damage identification module 406 may use the trained damage identification model to obtain a damage category prediction result 408. A format of damage prediction result 408 depends on the mapping table 412 that was used while tagging the training sample set. For example, if a training sample in the tagged training sample set is tagged by a digital tag as illustrated in the mapping table of Table 1, then damage category prediction result 408 may also be a digital category result, e.g., damage category prediction result 408 can include only digits 03. Damage category prediction result 408 corresponds to a damage category tag that includes information indicative of the damage material and the damage mode. For example, if a training sample in the tagged training sample set was tagged using digital tag according to the mapping table illustrated in Table 1, then damage prediction result 408 may, for example, include only digits 03.

Damage identification module 406 may provide damage category prediction result 408 to damage determination model 410. Damage determination module 410 may use mapping table 412 and damage category prediction result 408 to determine information indicative of the damage material and the damage mode 414. For example, for damage prediction result of 03, damage determination module 406 may query mapping table 412, i.e., the same mapping table 412 that was used during the process of training the damage identification model, to determine that the prediction result of vehicle damage in the on-site picture of the vehicle corresponds to fragmentation of the glass.

During the process of training the damage identification model, the damage category tag used may further include information indicative of the damage degree. Accordingly, during the process of damage prediction or damage assessment based on the trained damage identification model, the information indicative of the damage degree of the vehicle may also be determined based on damage category prediction result 408. For example, if damage category prediction result 408 is 04, then damage determination module 410 may determine that prediction result 414 of vehicle damages present in on-site vehicle picture 404 is a minor scratch of a painted piece. Prediction result 414 includes information indicative of the damage material, the damage degree, and the damage mode.

In one embodiment of the present invention, damage category tag may also include a repair solution category. For example, in Table 1, digital tag 03 may correspond to a repair solution "replace the glass," and digital tag 04 may correspond to a repair solution "re-paint the piece." Therefore, a repair solution may be directly determined based on damage category prediction result 408. For example, if damage category prediction result 408 is 03, then the damage determination module 410 may determine based on mapping table 412 that the repair solution is "replace the glass." In a further example, if damage category prediction result 408 is 04, the damage determination module 410 may determine based on mapping table 412 that the repair solution is "re-paint the piece." In other words, damage determination module 410 may be capable of providing a repair solution, thereby making damage assessment of the vehicle direct and convenient.

Figure 5:
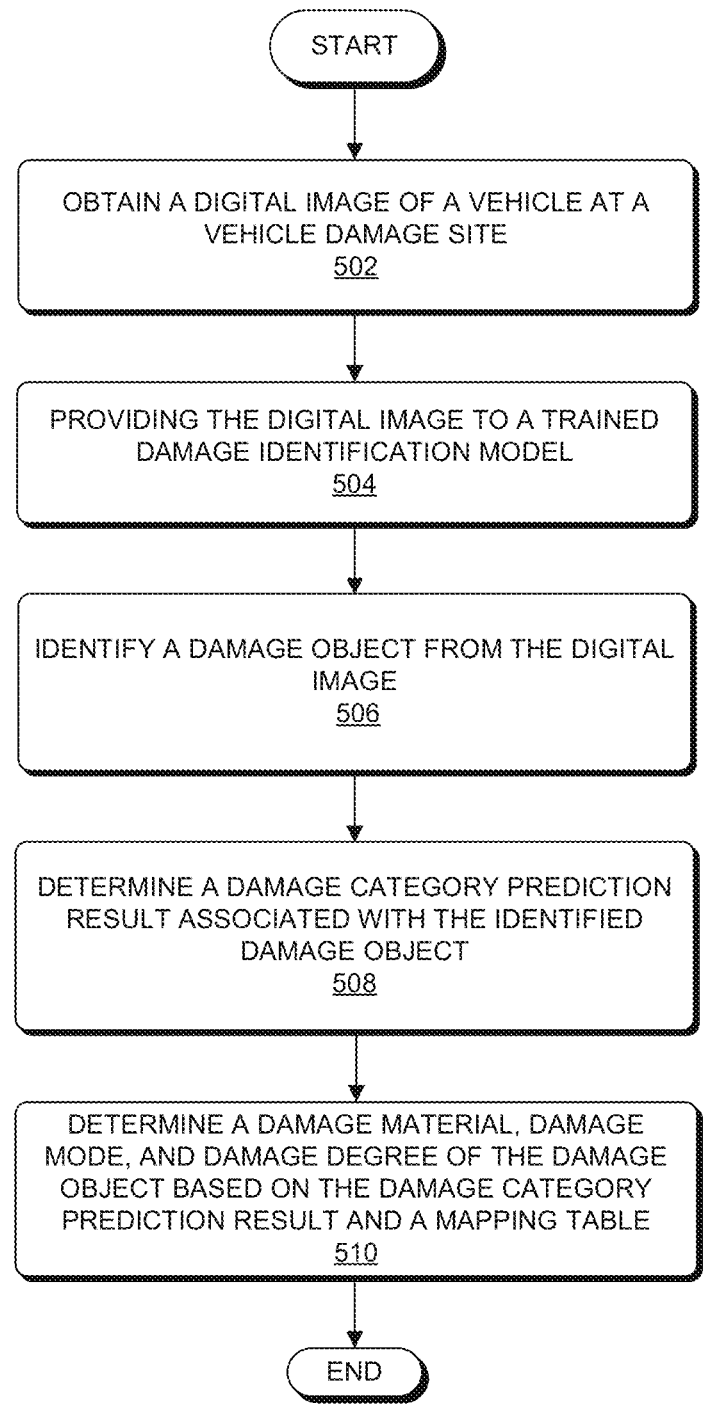
FIG. 5 presents a flowchart illustrating an exemplary process for performing damage assessment using a trained damage identification model, according to one embodiment of the present invention

FIG. 5 presents a flowchart illustrating an exemplary process for performing damage assessment using a trained damage identification model, according to one embodiment of the present invention. First, the system may obtain a digital image of a damaged vehicle (operation 502). The system then provides the digital image to a trained damage identification model to obtain a damage category prediction result (operation 504). Next, the system may identify a damage object from the digital image of the damage vehicle (operation 506). The system can then determine the damage category prediction result for the identified damage object based on a mapping table that was used during the process of training the damage identification model (operation 508). Based on the value of the damage category prediction result and the mapping table, the system may determine information that is indicative of damage material and a damage mode of the vehicle (operation 510). The system may also determine information indicative of a damage degree of the vehicle based on the damage category prediction result and the mapping table. In addition, the system can determine a repair solution for the damaged vehicle based on the damage category prediction result (operation 510).

Figure 6:
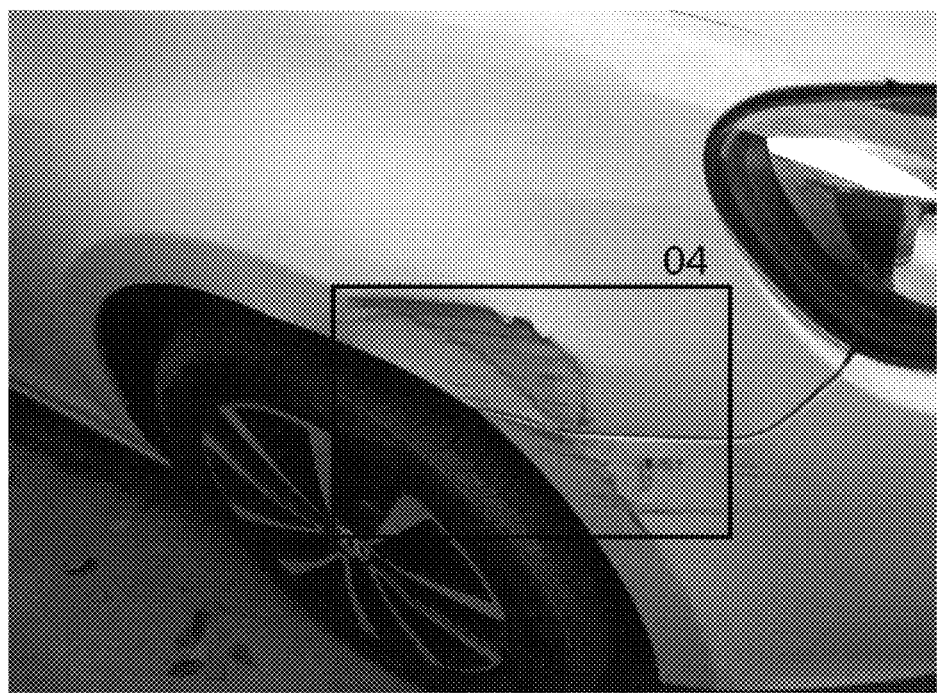
FIG. 6 shows a picture of a damaged vehicle including a damage category tag, according to one embodiment of the present invention.

FIG. 6 shows a picture of a damaged vehicle including a damage category tag, according to one embodiment of the present invention. The tagged vehicle picture in FIG. 6 includes a rectangular bounding box that marks the area where the damage object is located. The rectangular bounding box contiguously surrounds the damaged area. The tagged picture further includes a tag for a damage category of the damage object marked by the bounding box. For example, the digits 04 at the upper right corner of the bounding box represent the damage category tag. Based on the mapping table illustrated in Table 1, the damage category tag 04 indicates that the damage information corresponding to the damage object is minor scratch of the painted piece.

The damage category tag may also correspond to a repair solution category. In other words, the damage category tag can be pre-defined with respect to the category of a repair solution. For example, digital tag 04 may correspond to damage information "minor scratch of the painted piece," and this damage information may correspond to a repair solution "re-paint the piece." Tagging of vehicle pictures in this manner may result in better subsequent damage assessment operations.

Exemplary Computer System and Apparatus

Figure 7:
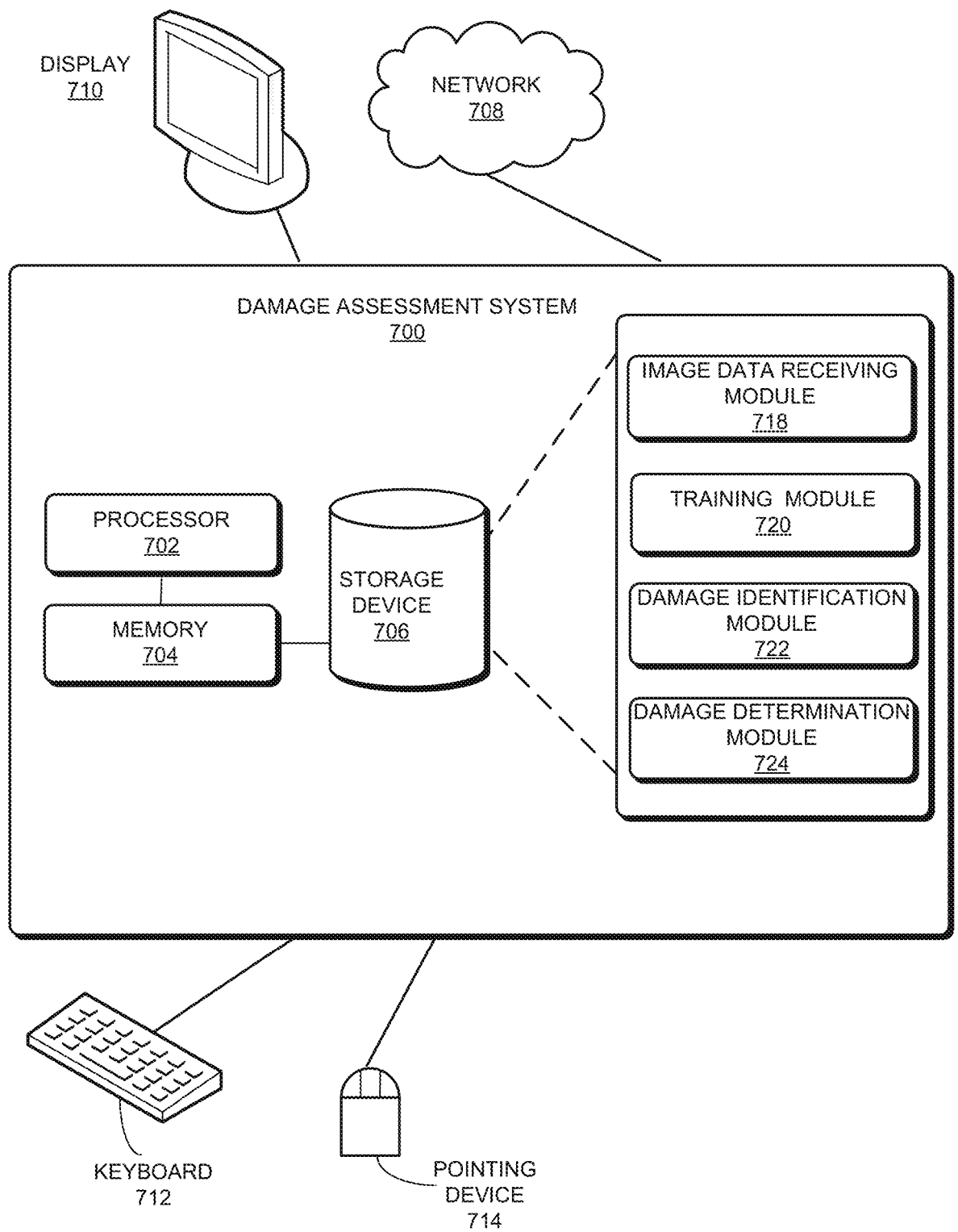
FIG. 7 illustrates an exemplary computer system that facilitates training of a damage identification model, according to one embodiment of the present invention.

FIG. 7 illustrates an exemplary computer system that facilitates training of a damage identification model, according to one embodiment of the present invention. Damage assessment system 700 includes a processor 702, a memory 704, and a storage device 706. Damage assessment system 700 can be coupled to a display device 710, a keyboard 712, and a pointing device 714, and can also be coupled via one or more network interfaces to network 708.

In one embodiment, storage device 706 can include instructions, which when executed by processor 702 can cause damage assessment system 700 to perform methods and/or processes described in this disclosure. During operation of damage assessment system 700, image data receiving module 718 can receive image data that includes digital images of a damaged vehicle. For the purpose of training a damage identification model, image data receiving module 718 can be configured to also receive image data that includes a plurality of test digital images corresponding to a set of test damaged vehicles. Training module 720, can be configured to train a damage identification model based on a tagged training sample set obtained from the plurality of test digital images. Next, damage identification module 722 can apply a trained damage identification model to determine a damage category prediction result. Consequently, damage determination module 724 can determine a damage material, a damage mode, a damage degree and a repair solution based on the damage category prediction result. In some embodiments, modules 718-724 can be partially or entirely implemented in hardware and can be part of the processor 702.

Figure 8:
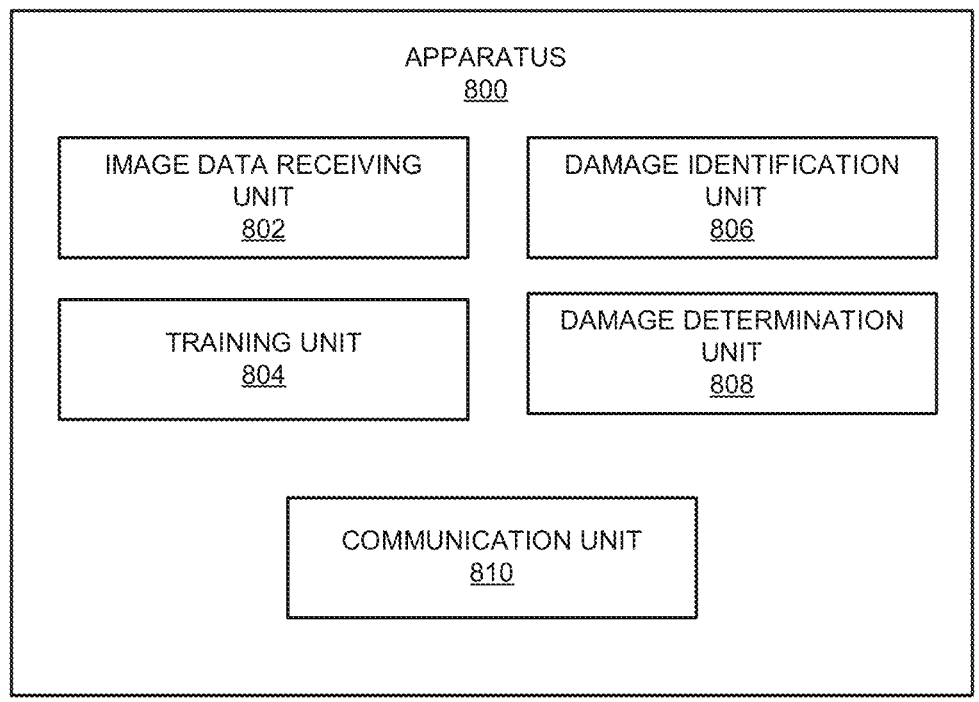
FIG. 8 illustrates an exemplary apparatus that facilitates training of a damage identification model, according to one embodiment of the present invention.

FIG. 8 illustrates an exemplary apparatus that facilitates training of a damage identification model, according to one embodiment of the present invention. Apparatus 800 can comprise a plurality of units or apparatuses that may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-808, which perform functions or operations similar to modules 718-724 of computer system 700 of FIG. 7, including: an image data receiving unit 802, a training unit 804, a damage identification unit 806, and a damage determination unit 808. Apparatus 800 can further include a communication unit 810.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for identifying damages of a vehicle, the method comprising:
    obtaining, by a computing device, a set of tagged digital images as training data, wherein each tagged digital image includes at least one damage object;
    training, based on the training data, a damage identification model independent of a part associated with the damage object, wherein training the damage identification model comprises:
        identifying at least a damage object in the training data based on a target detection technique;
        generating a set of feature vectors for the training data; and
        using the set of feature vectors to optimize a set of parameters associated with the damage identification model to obtain a trained damage identification model; and
    applying the trained damage identification model to obtain a damage category prediction result.

2. The method of claim 1, wherein an area comprising the damage object is tagged with a damage bounding box and a damage category tag corresponding to the damage bounding box, and wherein the damage category tag indicates a damage material and a damage mode.

3. The method of claim 2, wherein the damage material includes one of:
    a painted piece;
    a plastic piece;
    a metal piece;
    a sanded piece; and
    a glass.

4. The method of claim 2, wherein the damage mode includes one of:
    a scratch;
    a deformation;
    a crack; and
    a fragmentation.

5. The method of claim 2, wherein the damage category tag further indicates a damage degree, and wherein the damage degree corresponds to at least one of:
    minor damage;
    medium damage; and
    severe damage.

6. The method of claim 1, wherein training the damage identification model further comprises reducing noise associated with the identified damage object in the training data prior to generating the feature vectors, and wherein reducing the noise comprises:
    determining whether a sub-area associated with the identified damage object corresponds to a maximum damaged area;
    in response to determining that the sub-area does not include the maximum damaged area, filtering out negative matches; and
    retaining positive matches.

7. The method of claim 6, wherein the negative matches indicate that the one or more portions in the sub-area do not include the damage object, and wherein the positive matches indicate that the one or more portions in the sub-area includes the damage object.

8. The method of claim 1, wherein applying the trained damage identification model to obtain a damage category prediction result comprises:
    obtaining an untagged digital image of a target object;
    providing the digital image to the trained damage identification model;
    using the trained damage identification model to:
        identify a damage object from the digital image; and
        determine a damage category prediction result associated with the identified damage object; and determining a damage material and a damage mode of the damage object based on the damage category prediction result and a mapping table.

9. The method of claim 8, further comprising:
determining a repair solution based on the damage category prediction result.

10. An apparatus for identifying damages of a vehicle, the apparatus comprising:
one or more processors; and
a storage medium storing instructions that, when executed by the one or more processors, cause the apparatus to perform a method comprising:
obtaining, by a computing device, a set of tagged digital images as training data, wherein each tagged digital image includes at least one damage object;
training, based on the training data, a damage identification model independent of a part associated with the damage object, wherein training the damage identification model comprises:
identifying at least a damage object in the training data based on a target detection technique;
generating a set of feature vectors for the training data; and
using the set of feature vectors to optimize a set of parameters associated with the damage identification model to obtain a trained damage identification model; and
applying the trained damage identification model to obtain a damage category prediction result.

11. The apparatus of claim 10, wherein an area comprising the damage object is tagged with a damage bounding box and a damage category tag corresponding to the damage bounding box, and wherein the damage category tag indicates a damage material and a damage mode.

12. The apparatus of claim 10, wherein training the damage identification model further comprises reducing noise associated with the identified damage object in the training data prior to generating the feature vectors, and wherein reducing the noise comprises:
determining whether a sub-area associated with the identified damage object corresponds to a maximum damaged area;
in response to determining that the sub-area does not include the maximum damaged area, filtering out negative matches; and
retaining positive matches.

13. The apparatus of claim 12, wherein the negative matches indicate that the one or more portions in the sub-area do not include the damage object, and wherein the positive matches indicate that the one or more portions in the sub-area includes the damage object.

14. The apparatus of claim 10, wherein applying the trained damage identification model to obtain a damage category prediction result comprises:
obtaining an untagged digital image of a target object;
providing the digital image to the trained damage identification model;
using the trained damage identification model to:
identify a damage object from the digital image; and
determine a damage category prediction result associated with the identified damage object; and
determine a damage material and a damage mode of the damage object based on the damage category prediction result and a mapping table.

15. The apparatus of claim 14, wherein the method further comprising:
determining a repair solution based on the damage category prediction result.

16. A non-transitory computer-readable storage medium storing instructions that when executed by a computer cause the computer to perform a method for identifying damages of a vehicle, the method comprising:
obtaining, by a computing device, a set of tagged digital images as training data, wherein each tagged digital image includes at least one damage object;
training, based on the training data, a damage identification model independent of a part associated with the damage object, wherein training the damage identification model comprises:
identifying at least a damage object in the training data based on a target detection technique;
generating a set of feature vectors for the training data; and
using the set of feature vectors to optimize a set of parameters associated with the damage identification model to obtain a trained damage identification model; and
applying the trained damage identification model to obtain a damage category prediction result.

17. The non-transitory computer-readable storage medium claim 16, wherein an area comprising the damage object is tagged with a damage bounding box and a damage category tag corresponding to the damage bounding box, and wherein the damage category tag indicates a damage material and a damage mode.

18. The non-transitory computer-readable storage medium claim 16, wherein training the damage identification model further comprises reducing noise associated with the identified damage object in the training data prior to generating the feature vectors, and wherein reducing the noise comprises:
determining whether a sub-area associated with the identified damage object corresponds to a maximum damaged area;
in response to determining that the sub-area does not include the maximum damaged area, filtering out negative matches; and
retaining positive matches.

19. The non-transitory computer-readable storage medium claim 18, wherein the negative matches indicate that the one or more portions in the sub-area do not include the damage object, and wherein the positive matches indicate that the one or more portions in the sub-area includes the damage object.

20. The non-transitory computer-readable storage medium claim 16, wherein applying the trained damage identification model to obtain the damage category prediction result comprises:
obtaining an untagged digital image of a target object;
providing the digital image to the trained damage identification model;
using the trained damage identification model to:
identify a damage object from the digital image; and
determine a damage category prediction result associated with the identified damage object; and
determine a damage material and a damage mode of the damage object based on the damage category prediction result and a mapping table.

* * * * *